(12) United States Patent
Koteshwara et al.

(10) Patent No.: US 12,423,437 B2
(45) Date of Patent: Sep. 23, 2025

(54) FUZZING BASED SECURITY ASSESSMENT

(71) Applicant: International Business Machines Corporation, Armonk, NY (US)

(72) Inventors: Sandhya Koteshwara, White Plains, NY (US); Jose Gabriel Castanos, Yorktown Heights, NY (US); Hubertus Franke, Cortlandt Manor, NY (US); Paul Gregory Crumley, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 17/448,606

(22) Filed: Sep. 23, 2021

(65) Prior Publication Data

US 2023/0092205 A1 Mar. 23, 2023

(51) Int. Cl.
*G06F 21/57* (2013.01)
*G06F 13/42* (2006.01)
*G06F 21/85* (2013.01)

(52) U.S. Cl.
CPC ........ *G06F 21/577* (2013.01); *G06F 13/4221* (2013.01); *G06F 21/85* (2013.01); *G06F 2213/0026* (2013.01)

(58) Field of Classification Search
CPC .... G06F 21/577; G06F 13/4221; G06F 21/85; G06F 2213/0026
See application file for complete search history.

(56) References Cited

U.S. PATENT DOCUMENTS

| 2006/0193342 | A1 | 8/2006 | Sarsfield | |
|---|---|---|---|---|
| 2007/0036082 | A1 | 2/2007 | Sonksen | |
| 2012/0005392 | A1* | 1/2012 | Yagi | G06F 13/409 710/313 |
| 2012/0260234 | A1 | 10/2012 | Jivane | |
| 2012/0260345 | A1* | 10/2012 | Quinn | G06F 21/57 726/26 |

(Continued)

FOREIGN PATENT DOCUMENTS

| CN | 105656716 A | 6/2016 |
|---|---|---|
| CN | 106709120 A | 5/2017 |
| WO | 2023/046492 A1 | 3/2023 |

OTHER PUBLICATIONS

International Search Report and Written Opinion, International Application No. PCT/EP2022/074971, International Filing Date Sep. 8, 2022.

(Continued)

*Primary Examiner* — Ellen Tran
(74) *Attorney, Agent, or Firm* — Joseph Curcuru; Andrew D. Wright; Calderon Safran & Wright P.C.

(57) ABSTRACT

A computer implemented method for assessing endpoint security includes identifying a size of exposed PCIe space corresponding to a system of interest comprising one or more endpoints, determining an observable state of correct functionality for the system, generating random transaction layer packets corresponding to the endpoint, injecting the generated transaction layer packets, monitoring the system following the injection of the generated transaction layer packets for erroneous patterns exhibited by the system, and reporting the erroneous patterns exhibited by the system. A corresponding computer program product and computer system are also disclosed.

20 Claims, 6 Drawing Sheets

(56) References Cited

U.S. PATENT DOCUMENTS

| | | | | |
|---|---|---|---|---|
| 2013/0067127 | A1* | 3/2013 | Hopgood | G06F 13/00 710/104 |
| 2016/0077858 | A1* | 3/2016 | Hunter | G06F 13/4221 710/104 |
| 2016/0371222 | A1* | 12/2016 | Yifrach | G06F 12/1441 |
| 2017/0337069 | A1* | 11/2017 | Huang | G06F 13/4282 |
| 2019/0220389 | A1 | 7/2019 | Finger et al. | |
| 2019/0228145 | A1* | 7/2019 | Shanbhogue | G06F 13/1668 |
| 2019/0251055 | A1* | 8/2019 | Chen | G06F 1/3228 |
| 2021/0067451 | A1* | 3/2021 | Duenas | G06F 13/385 |

OTHER PUBLICATIONS

Sang et al., "A Tool to Analyze Potential I/O Attacks against PCs", Copublished by the IEEE Computer and Reliability Societies, Mar./Apr. 2014, 7 pages.

"Billfarrow / pcimem", GitHub, downloaded from the Internet on Sep. 20, 2021, 4 pages, <https://github.com/billfarrow/pcimem>.

"Chipsec", GitHub, dowloaded from the Internet on Sep. 20, 2021, 3 pages, <https://github.com/chipsec/chipsec>.

"Falconwitch", Inventec, Data Center Solutions, downloaded from the Internet on Sep. 20, 2021, 3 pages, <https://ebg.inventec.com/en/product/CDI/PCIE%20Switch/Falconwitch>.

"PCI Express® Device Security Enhancements", Specification, Intel, Sep. 2018, Version 0.71, 46 pages.

"Ufrisk / pcileech", GitHub, downloaded from the Internet on Sep. 20, 2021, 11 pages, <https://github.com/ufrisk/pcileech>.

Chen et al., "Adaptive Random Testing", Asian 2004: Advances in Computer Science—Asian 2004, Higher-Level Decision Making, Abstract only, 4 pages.

CVE, search, downloaded from the Internet on Sep. 20, 2021, 17 pages, <https://cve.mitre.org/cgi-bin/cvekey.cgi?keyword=CVE%3A+Common+Vulnerabilities+and+Exposures>.

Daubignard et al., "ProTIP : You Should Know What to Expect From Your Peripherals", Published 2017, 35 pages.

Drysdale, David, "Coverage-guided kernel fuzzing with syzkaller", LWN.net, Mar. 2, 2016, 7 pages.

Hansbrough, Julia, "Fuzzing PCI express: security in plaintext", Google Cloud, Feb. 9, 2017, 5 pages.

Jackson et al., "PCI Express Technology: Comprehensive Guide to Generations 1.x, 2.x and 3.0", Mindshare Press, Publication Date May 4, 2015, book description only, 9 pages.

Patrick-Evans et al., "POTUS: Probing Off-The-Shelf USB Drivers with Symbolic Fault Injection", 11th {USENIX} Workshop on Offensive Technologies ({WOOT} 17), 2017, 10 pages.

Peng et al., "USBFuzz: A Framework for Fuzzing {USB} Drivers by Device Emulation", 29th USENIX Security Symposium, Aug. 12-14, 2020, 18 pages.

Perez-Botero et al., "Characterizing Hypervisor Vulnerabilities in Cloud Computing Servers", CloudComputing'13, May 8, 2013, Hangzhou, China, 8 pages.

Seaborn et al., "Exploiting the DRAM rowhammer bug to gain kernel privileges", Mar. 9, 2015, this article was originally published on the Google Project Zero blog, 14 pages.

Song et al., "Agamotto: Accelerating Kernel Driver Fuzzing with Lightweight Virtual Machine Checkpoints", 29th USENIX Security Symposium, Aug. 12-14, 2020, 18 pages.

Song et al., "PeriScope: An Effective Probing and Fuzzing Framework for the Hardware-OS Boundary", Network and Distributed Systems Security (NDSS) Symposium 2019, Feb. 24-27, 2019, San Diego, CA, USA, 15 pages.

Tian et al., "LBM: A Security Framework for Peripherals within the Linux Kernel", 2019 IEEE Symposium on Security and Privacy, © 2019, IEEE, 18 pages.

* cited by examiner

FUZZING BASED SECURITY ASSESSMENT

BACKGROUND

The present invention relates generally to the field of security assessment, and more specifically, to creating a systematic security assessment framework for peripheral component interface express endpoint devices.

Modern computing infrastructure is composed of a large number of hardware components, including smart devices, interconnected using complex networks. The next generation of computing is moving away from traditional hardware managed by the IT department of a company towards remote computing environments such as cloud. In a multi-tenant cloud, security is essential and hardware to enforce security is a high priority. To be able to scale to a large number of users, cloud environments are increasingly relying on a variety of hardware devices to perform tasks that were traditionally performed using software. Thus, there is a proliferation of hardware endpoint devices capable of performing network acceleration, storage, virtualization, machine learning workload acceleration and data encryption in the computing infrastructure.

Fuzzing or fuzz testing is a commonly used testing technique where invalid or random data is applied to a system and the system is monitored for crashes, fails, memory leaks, etc. Fuzzing has been used to identify vulnerabilities on GPU endpoints by mimicking its behavior using programmable network interface controllers. Open source frameworks are available which analyze PC platforms and include a peripheral component interface express (PCIe) fuzzer configured to check for vulnerabilities due to endpoints. More specialized tests based on FPGAs which address the concern of direct memory access (DMA) by endpoints and the problems associated with the access control service (ACS) of PCIe have been developed. Another example of fuzzing is the systematic fuzzing framework as deployed in operating systems.

SUMMARY

As disclosed herein, a computer implemented method for assessing endpoint security includes identifying a size of exposed PCIe space corresponding to a system of interest comprising one or more endpoints, determining an observable state of correct functionality for the system, generating random transaction layer packets corresponding to the endpoint, injecting the generated transaction layer packets, monitoring the system following the injection of the generated transaction layer packets for erroneous patterns exhibited by the system, and reporting the erroneous patterns exhibited by the system. A corresponding computer program product and computer system are also disclosed.

DETAILED DESCRIPTION

In the modern cloud environment, it has become important to consider both the impact of malicious devices on the cloud infrastructure as well as the effect of a malicious host with root access on endpoint devices. Obtaining root access to systems is increasingly likely due to attacks in the hypervisor space, side-channel attacks such as rowhammer, and the use case of provisioning bare-metal servers. Among the several interfaces of endpoint devices, the PCIE is a commonly used high speed communication protocol to connect devices within a host subsystem. PCIE is a complex specification that can be hard to verify and includes significant details which are highly dependent on the specific implementation.

Due to threats from malicious root access to endpoints, a systematic framework to uncover security vulnerabilities in the PCIE interface of endpoints is required. This method should go beyond traditional functional verification by placing the device in an insecure environment. The framework must be able to generate violations in the PCIE packet protocol to identify cases of erroneous behavior. The effect of these violations must be observable on the state of the system and erroneous patterns should be recorded. Finally, the security tests should be repeatable for necessary duration of time in order to establish better security characteristics for the endpoint device.

Embodiments of the present invention correspond to a systematic security assessment framework for PCIE endpoint devices in the presence of malicious root access using fuzzing based test techniques. Embodiments of the present invention will now be described with respect to the Figures. A specific use case of one or more embodiments of the present invention is a security assessment framework designed for PCIE based Network Interface Controller (NIC) cards. The NIC is used as an exemplary embodiment to explain some steps of the framework, but it should be appreciated that said steps are not limited to use with respect to an NIC framework.

Figure 1:
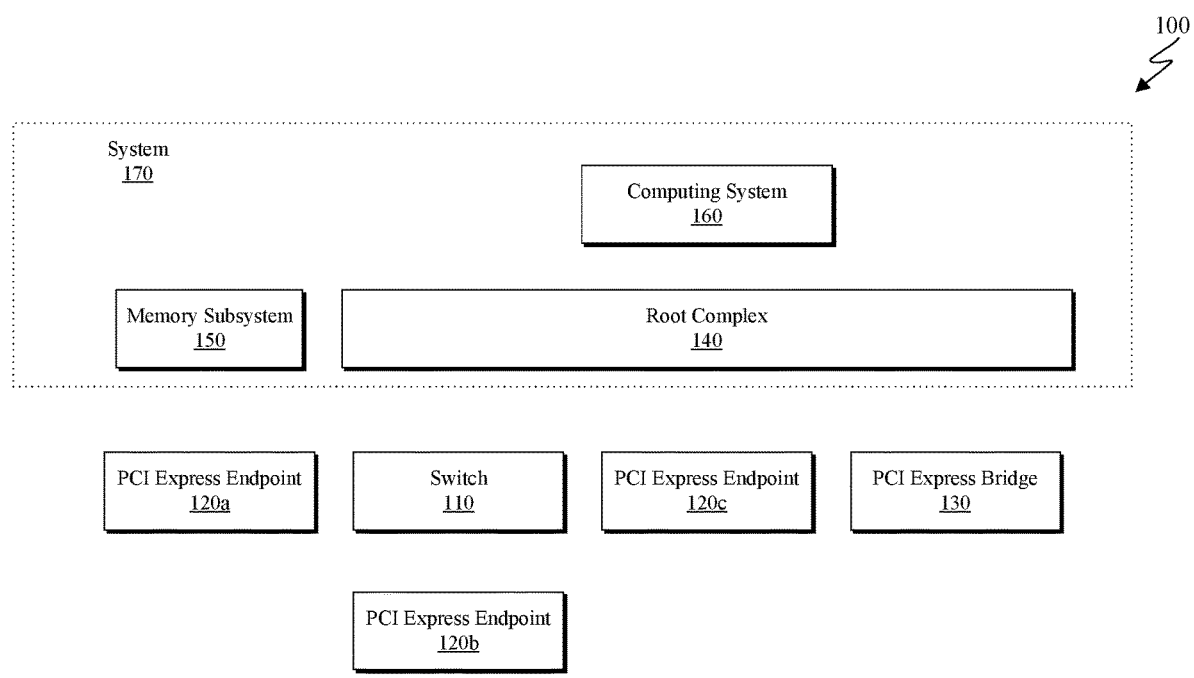
FIG. 1 is a block diagram depicting a PCIE topology in accordance with an embodiment of the present invention.

PCIE is a high-performance, general purpose I/O interconnect designed to replace older PCI standards. In general, PCIe is a highly scalable, fully serial interface, based on point-to-point packet transfers using a switch-based topology. FIG. 1 depicts an example of a PCIE topology 100 in accordance with an embodiment of the present invention. As depicted, PCIE topology 100 includes switch 110, PCIE endpoints 120 (120a, 120b, and 120c), PCIE bridge 130, root complex 140, memory subsystem 150, computing system 160, and system 170. With respect to the depicted environment, the components captured by the dashed box (namely root complex 140, memory subsystem 150, and computing system 160) all correspond to system 170. In general, system 170 is configured to simulate malicious user device activity. In general, PCIe protocol can be divided into three logical layers: a transaction layer, a data link layer, and a physical layer. The transaction layer is responsible for creating transaction layer packets, or TLPs. TLPs can be memory, I/O. configuration, or message transactions. TLPs can consist of several fields with rules to structure a bit or group of bits. Some TLP fields are marked as reserved, and handling of these bits may be specified by device implementation. Erroneous construction of the TLP bits results in either the receiver ignoring said bits or in generation of erroneous packets, such as malformed packets or unsupported requests. The data link layer is largely responsible for managing links and maintaining data integrity. Upon detection of an error, the data link layer may be responsible for requesting retransmission of TLPs until correct information is received or a link failure is established. The physical layer is responsible for converting information received from the data link layer into a serialized format and transmitting across the PCIe link.

In some embodiments, the configuration space of PCIe can extend to 4096 bytes, out of which a first 256 bytes are PCI compatible, and the rest comprise PCIe extended configuration space. Memory-mapped address spaces are used to access configuration registers, wherein the memory address corresponds to the configuration register. Base Address Registers (BARs) are used to specify how much memory a device wants to be mapped in the main memory of the host. The host writes the base address where the mapped memory begins to the BAR register. Each device can have 6 32-bit BARs or can combine BARs to make it a 64-bit BAR. Memory transactions between the root complex and the device are then carried out through these memory mapped regions. Depending on the device, the mapped regions could be read only, write only, or read/write privileged.

Since PCIe is packet based, to prevent overflow of receive buffers, and to maintain the correct ordering of packets, Flow Control (FC) is required. FC is handled by the transaction layer and the data link layer using flow-control credits. Each type of TLP consumes a certain number of flow control credits based on the type of information it contains. During the FC initialization process, receivers must advertise available credit values. The receiver keeps track of credits allocated and credits received. The transmitter, on the other hand, keeps track of the credits consumed and the credit limit of the receiver. FC only takes care of flow across a link, and notably does not monitor end to end transaction flow.

Single root I/O virtualization (SR-IOV) interface is an extension to the PCIe specification and allows a device to separate access of its resources to different functions. The functions include a physical function (PF) and zero or more virtual functions (VF). While the PF is associated with the hypervisor parent partition, each VF may be associated with a hypervisor child partition in a virtualized environment. The I/O Memory Management Unit (IOMMU) can differentiate the traffic flow and apply memory translations between the PF and VFs.

A root complex is able to generate TLPs targeting the configuration, memory, I/O, and message space of endpoints. Hence, in a scenario where the root has turned malicious, the number of accesses available to the malicious entity via PCIe interface is exponentially large. The complexity of a PCIe protocol can be calculated based on varying data width, serial writes, and random writes. The PCIe configuration space can be accessed as n=8,16,32 bit registers. Some of the registers should only be accessed using a specific width and doing otherwise can result in incorrect or unspecified behavior of the device. Thus, for each type of register access, there are $v=2^8$, $2^{16}$, or $2^{32}$ values that can be written corresponding to n=8, 16, or 32 respectively. By writing all possible values to the registers, reserved bits of the space are also accessed. If the registers are written in a serial order targeting one register at a time, the total number of writes required is equal to $t=v \times N$, where N=4096, 2048, or 1024 for byte, word, or long word accesses, respectively. If all values are written to all registers, the number of writes required to cover the space can reach a complexity of $10^{12}$.

With respect to the PCIe specification, ordering transactions is as important as structure. For example, some configuration registers may be doorbell registers, meaning the data register must be accessed before the address register is written. If access occurs in reverse, the device can get it into unpredictable or unspecified states. Random access refers to registers can be performed by writing to k different registers at a time, for k ranging from 1 to N. The total number of accesses is equal to the permutation $t=P(N,k)$ for k=1, 2, . . . , N. For a value of k=2, the complexity of the space is approximately $10^7$.

In order to cover a large space of the PCIe configuration and memory regions, the fuzz tests described herein incorporate a random testing technique. A random value is obtained in every iteration by sampling from a uniform distribution with replacement; to calculate the number of iteration, iter, principles from Central Limit Theorem (CLT) can be used. For serial writes, consider the maximum test complexity of writing $2^{32}$ values to 1024 long words. If each value is sampled from a discrete uniform random distribution $U[0,2^{32}-1]$, the mean μ is approximately $2^{31}$, and σ is approximately $2^{30}$. The number of samples to be picked from this distribution is equal to the number of iterations iter. By keeping a minimum value for iter, the mean of the sample distribution is kept close to the mean of the uniform distribution. For random writes, picking the value of k is equivalent to sampling from a uniform distribution U[0, N−1] and the corresponding number of iterations is equivalent to sampling from U[0, P(N,k)−1].

If a root complex on one or more hosts turns malicious and targets a PCIe interface of an NIC, several attack surfaces can open up. When a card does not boot up, availability and denial-of-service attacks become feasible. The NIC becomes unavailable and possibly not recoverable, which can result in the unavailability of corresponding cards for all users of that node. The TLPs could also be used to take control of the NIC and send incorrect data packets. With the NIC unable to perform data integrity functions, the packets can no longer be trusted. When the card comes back in erroneous states or unknown states, this results in possible data integrity and network integrity attacks. If control-flow information of the network has been off-loaded to the NIC<incorrect memory TLPs could be used to access and change important information such as flow tables. The deletion of modules on the card show that the access to restricted memory regions on the card might not be clearly defined, which in turn affects the control-flow integrity. Even if the PCIe root complex is not intentionally used for malicious access by the user, a buggy firmware on many hosts could be used to launch denial-of-service attacks which can disrupt the entire network. Several tests indicated that the OOB management is lost, which has extended consequences given the scale of infrastructure and the inability to physically access systems for resets. By taking over the NIC and compromising the control flow information, the packets which need to be routed to one node could be redirected to end up on the malicious root complex or another node. If a malicious data packet is able to bypass access controls on another host due to vulnerabilities of the hypervisor or the IOMMU, a large number of connected nodes on the network could be affected. In general, once the secure barrier between a malicious entity and the protected entity is broken, it is difficult to predict the possibility of what can ensue.

Root complex 140 denotes a root of the hierarchy corresponding to PCIE topology 100, and supports subhierarchies consisting of switches and endpoints. In general, root complex 140 can generate configuration and I/O requests as a requester of a transaction.

Computing system 160 can be a desktop computer, a laptop computer, a specialized computer server, or any other computer system known in the art. In some embodiments, computing system 160 represents computer systems utilizing clustered computers to act as a single pool of seamless resources. In general, computing system 160 is representative of any electronic device, or combination of electronic devices, capable of receiving and transmitting data, as described in greater detail with regard to FIG. 6. Computing system 160 may include internal and external hardware components, as depicted, and described in further detail with respect to FIG. 6.

Figure 2:
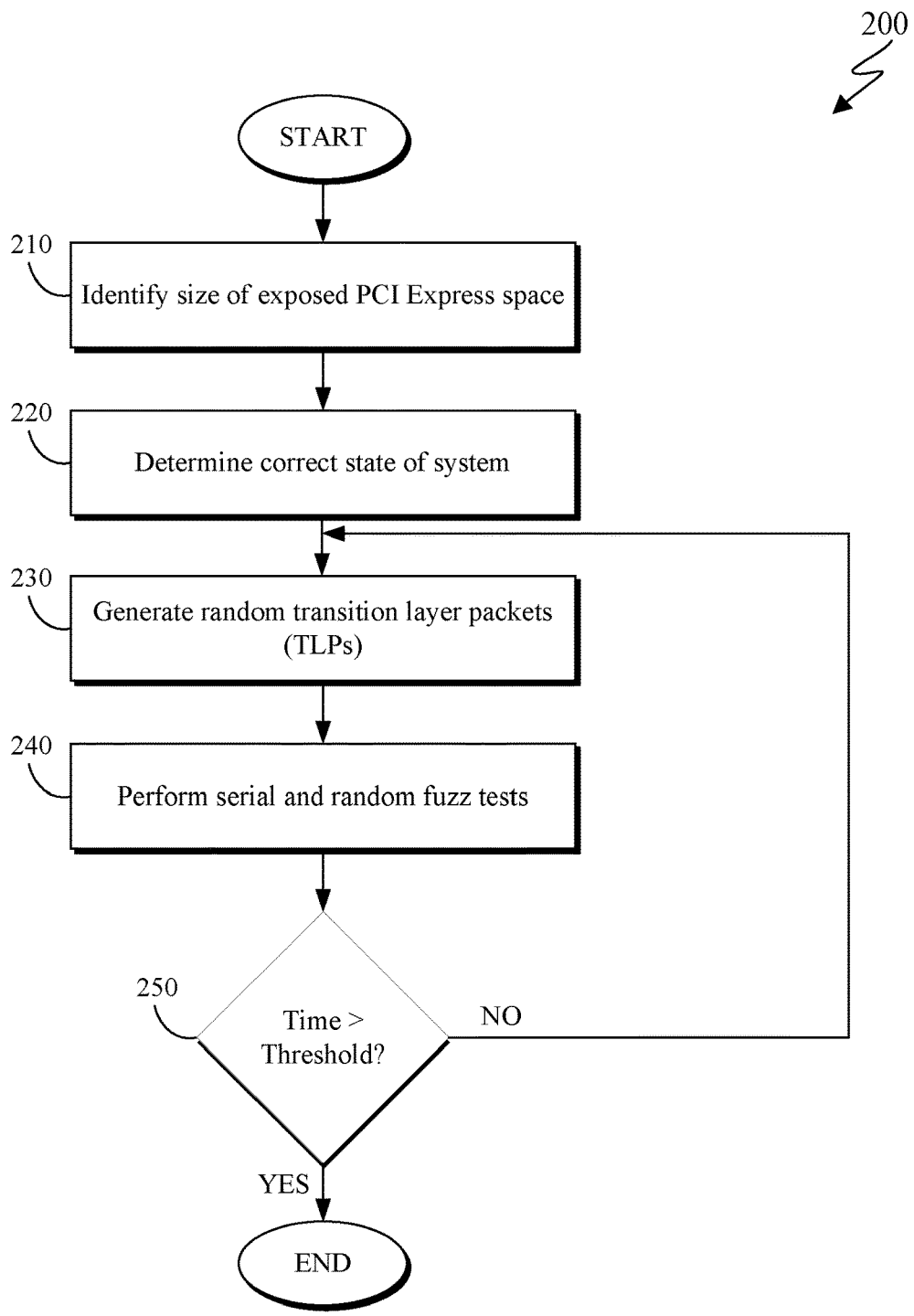
FIG. 2 is a flowchart depicting one embodiment of a security assessment method in accordance with at least one embodiment of the present invention.

FIG. 2 is a flowchart depicting one embodiment of a security assessment method 200 in accordance with at least one embodiment of the present invention. As depicted, security assessment method 200 includes identifying (210) a size of exposed PCIE space corresponding to a system, determining (220) a correct state of the system, generating (230) random transition layer packets (TLPs), performing (240) serial and random fuzz tests, and determining (250) whether the elapsed testing time has exceeded a threshold. Security assessment method 200 may enable improved security characteristics at a system endpoint via improved testing.

Identifying (210) a size of exposed PCIE space corresponding to a system may include analyzing a system of interest to identify exposed PCIE space. Since PCIE implementations may be different corresponding to each different endpoint, identifying (210) a size of exposed PCIE space includes identifying the resources exposed by a specific PCIE implementation and corresponding test complexity with respect to the system of interest and a corresponding endpoint.

Determining (220) a correct state of the system may include identifying an observable state of correct functionality for the system using the endpoint. In at least some embodiments, determining (220) a correct state of the system includes plugging the endpoint into in an environment in which its correct state is observable. An example of a test and monitoring setup appropriate for determining (220) a correct state of the system is described in detail with respect to FIG. 3. In general, tests utilized for determining (220) a correct state of the system can be conducted using commonly available Linux utilities. For example, determining (220) a correct state of the system may include using the Linux utility setpci to access the configuration space of the device. Setpci requires root privileges for all operations except certain reads. Read/write operations can be performed on any register and at any offset using byte, word, or long word width access. Determining (220) a correct state of the system may additionally include using open source application pcimem to access memory registers. In at least some embodiments, determining (220) a correct state of the system additionally includes determining which regions of memory are exposed by the PCIE device using sysfs; sysfys is a pseudo filesystem in Linux through which system configuration can be read or modified. The PCI files under sysfs contain a device ID, vendor ID, and resource files. Each resource file may correspond to a region of memory specified by BAR registers. Determining (220) a correct state of the system may additionally include using the Linux utility mmap to map PCI memory specified by resource files to an application space memory, allowing direct read and write access. The read and write can be at any offset and of byte, half-word, word, or double-word width.

Generating (230) random transition layer packets (TLPs) may include creating an appropriate number and type of malformed transaction layer packets (TLPs). In order to cover a large space of the PCIE configuration and memory regions, generating (230) random transaction layer packets (TLPs) includes using fuzz tests and incorporating a random fuzz testing technique to create random TLPs. Generating (230) random TLPs includes obtaining a random value in every iteration of testing by sampling from a uniform distribution with replacement. In at least some embodiments, generating (230) random TLPs includes applying principles from Central Limit Theorem (CLT) to calculate a number of iterations required (hereinafter iter). For serial writes, consider a maximum test complexity of writing $2^{32}$ values to 1024 long words. If each value is sampled from a discrete uniform random distribution U[0, $2^{32}-1$], the mean $\mu=2^{31}$ and $\sigma=2^{30}$. The number of samples picked from this distribution is equal to the number of iterations iter. Generating (230) random TLPs includes keeping a minimum value for iter and attempting to match a mean of the sample distribution to the uniform distribution. CLT states that if the number of samples is greater than 30, the mean of the samples follows a normal distribution with $\mu_x=\mu$ and $$\sigma_x = \frac{\sigma}{\sqrt{iter}}.$$

For a confidence level (CI) of 95%, the confidence interval is given by:

$$CI = \mu \pm 1.96 * \frac{\sigma}{\sqrt{iter}}$$

$$iter = \left(\frac{\sigma}{\frac{CI-\mu}{1.96}}\right)^2$$

To keep the confidence interval within 5% of the mean, the minimum number of iterations required is determined to be iter=384 according to the second equation above. Consider a value of k picked with respect to iter=1000. For random writes, picking the value of k is equivalent to sampling from a uniform distribution U[0, N−1] and the corresponding number of iterations is equivalent to sampling from U[0,P (N,k)−1]. Using calculated minimum values, k=1000 and iter=100,000. A higher value results in better coverage of the input test space but takes longer to test.

Performing (240) serial and random fuzz tests may include iteratively injecting the generated TLPs and recording erroneous patterns. In at least some embodiments, injecting the generated TLPs simulates one or more malicious entity actions. In at least some embodiments, performing (240) serial and random fuzz tests includes writing a random value of size x at address offsets which increase incrementally from y=0 to y=N, and subsequently monitoring the system for crashes, reboots, and network traffic. Performing (240) serial and random fuzz tests may include reporting any such crashes, reboots, and network traffic.

Determining (250) whether the elapsed testing time has exceeded a threshold may include comparing an elapsed timer to a selected threshold. If the elapsed testing time has exceeded a threshold (250, yes branch), the method terminates. If the elapsed testing time has not exceeded a threshold (250, no branch), the method continues by generating (230) random transaction layer packets.

In at least some embodiments, security assessment method 200 executes iteratively. If the system fails during execution, security assessment method 200 may additionally include analyzing erroneous patterns to identify causes of failures, and subsequently applying firmware fixes to pertinent PCIe protocols. Once any such causes are addressed, security assessment method 200 may again begin iterative execution until a next failure. In at least some embodiments, if tests run successfully for a specified threshold of time, the system may be considered to provide better security characteristics against PCIe based malicious access. In at least some embodiments, security assessment method 200 includes providing a security report indicating at least the results of the serial and random fuzz tests, as well as any crashes, reboots, or network traffic monitored during the duration of the testing.

Figure 3:
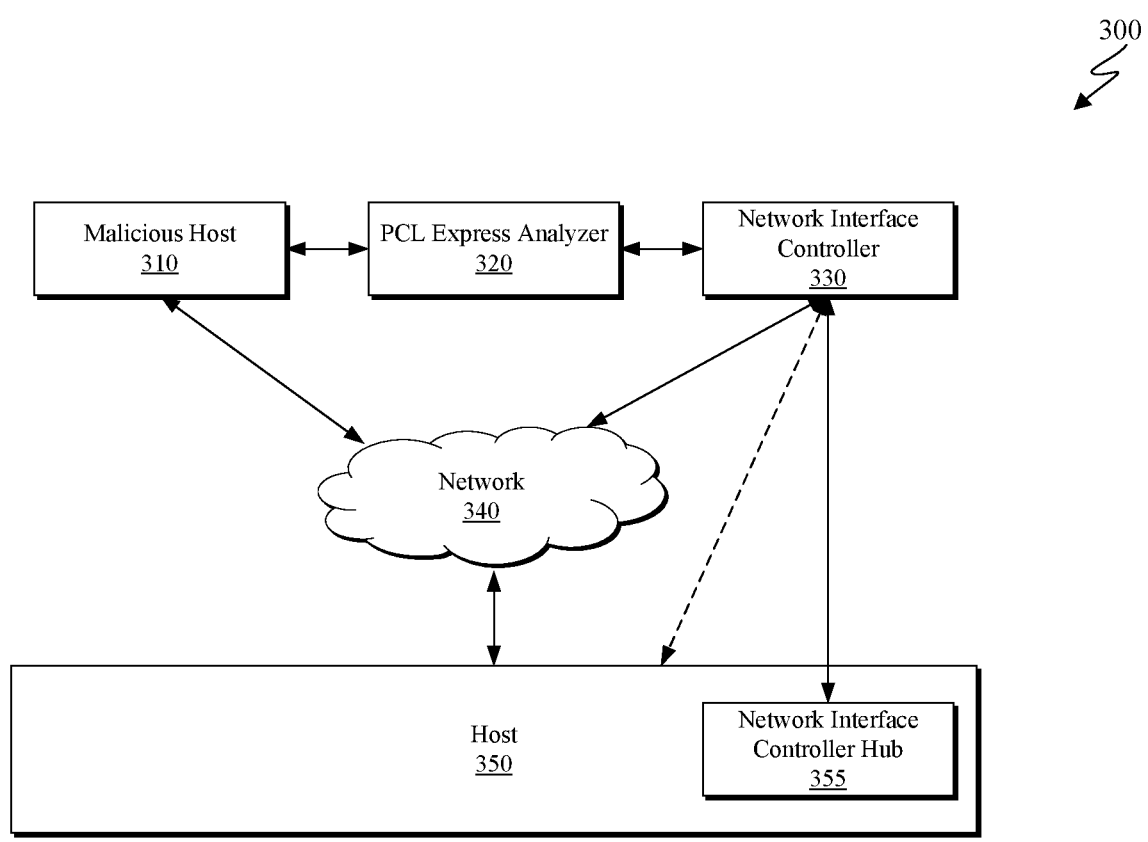
FIG. 3 is a block diagram depicting an example of a testing and monitoring setup in accordance with an embodiment of the present invention.
Figure 4:
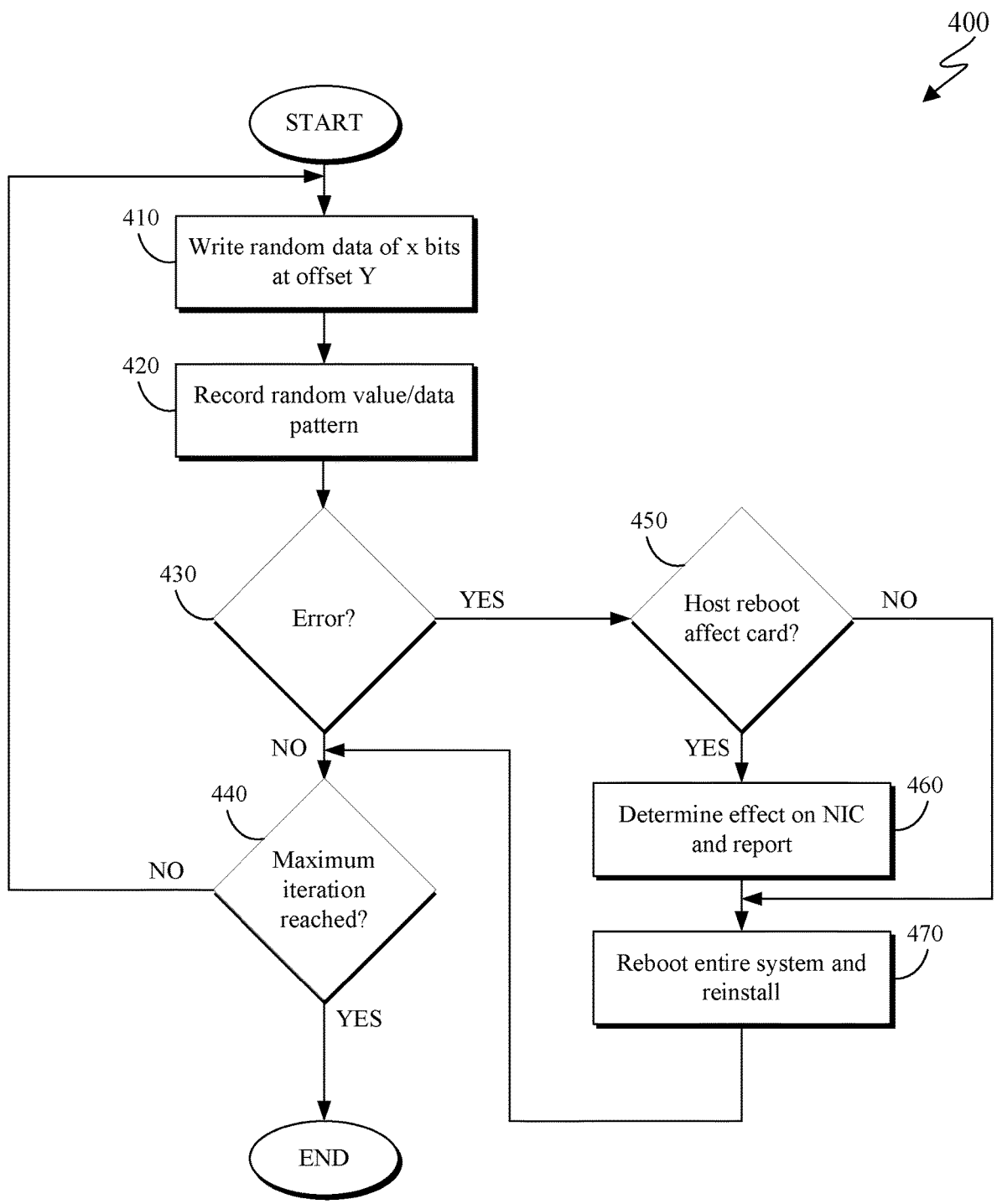
FIG. 4 is a flowchart depicting a serial write method in accordance with at least one embodiment of the present invention.
Figure 5:
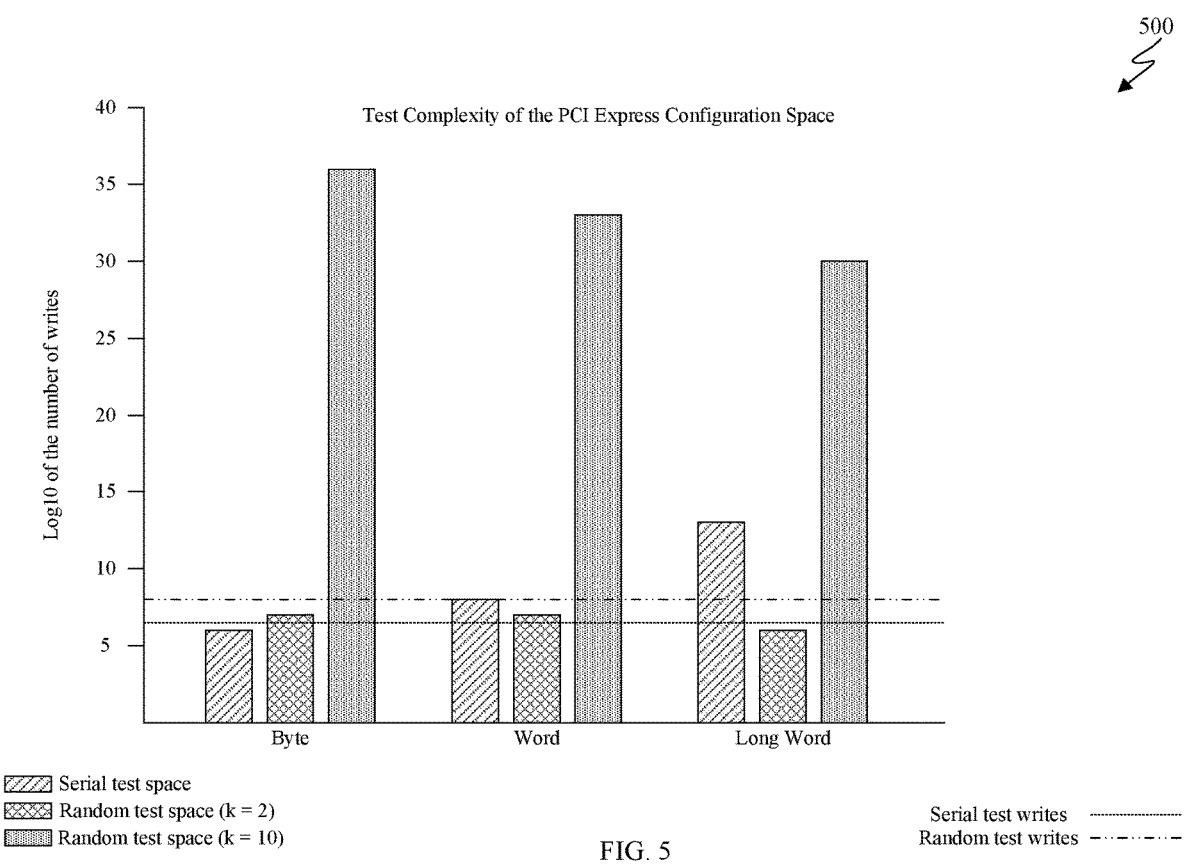
FIG. 5 is a bar graph depicting complexity of PCIe protocol in accordance with at least one embodiment of the present invention.

With respect to the following FIGS. 3-5, embodiments of the present invention are described with respect to an NIC (network interface card). It should be obvious to those skilled in the art that the same methods apply to other PCIe devices, such as PCIe based storage adapters, graphics processing units, machine learning accelerators, and the like.

FIG. 3 is a block diagram depicting an example of a testing and monitoring setup 300 in accordance with an embodiment of the present invention. As depicted, testing and monitoring setup 300 includes malicious host 310, PCIE analyzer 320, network interface controller (NIC) 330, network 340, and host 350. Testing and monitoring setup 300 may be configured to determine an observable state of correct functionality for a system of interest using an endpoint.

Malicious host 310 may be a malicious bare-metal host with root access. In the depicted embodiment, malicious host 310 is connected to PCIE analyzer 320; however, in other embodiments, malicious host 310 is connected to network interface controller 330 without a PCIE analyzer. In at least some embodiments, PCIE analyzer 320 corresponds to a Falconwitch, which is a composable PCIE system. As depicted, malicious host 310 is connected to host 350 via network interface controller 330. In general, host 350 corresponds to another host connected to a same network 340 as malicious host 310. In general, network interface controller 330 includes high speed ethernet ports, out-of-band (OOB) network ports, and serial consoles which help in bring-up and management. Malicious host 310, host 350, and the OOB network ports of network interface controller 330 are connected via a switch to an external network; these connections can be used for monitoring the network traffic on malicious host 310, host 350, and network interface controller 330. During testing, native network traffic flows between malicious host 310 and host 350 via NIC 330. There is traffic generated from the external network to continuously monitor the status of malicious host 310, NIC 330, and host 350. In at least some embodiments, a serial interface from host 350 to NIC 330 (depicted as a dashed line with respect to FIG. 3) enables a user to view the NIC's terminal and monitor it for crashes and reboots, access messages, and logs. A tool such as the ipmitool may allow access to logs of a baseboard management controller (BMC) to debug reboots. Once malicious host 310 successfully recovers from a crash, such a tool's logs can be used to identify the cause of a reboot. With respect to the depicted embodiment, host 350 includes network interface controller hub 355, which is a dedicated port or application via which NIC 330 communicates to host 350.

PCIE analyzer 320, while optional for proper operation of a testing and monitoring setup, may be configured to allow additional observations such as monitoring of PCIE traffic and debugging cause of reboots. When the PCIe analyzer is present, device under test (NIC 330 in this case) performs flow control with the PCIe analyzer rather than host 310. PCIE analyzer 320 may be configured to repeat serial and random tests on configuration and memory space for analysis.

Network 340 can be, for example, a local area network (LAN), a wide area network (WAN) such as the Internet, or a combination of the two, and include wired, wireless, or fiber optics connections. In general, network 340 can be any combination of connections and protocols that will support communications between malicious host 310, network interface controller 330, and host 350.

FIG. 4 is a flowchart depicting a serial write method 400 in accordance with at least one embodiment of the present invention. As depicted, serial write method 400 includes writing (410) random data of 'x' bits at offset 'Y', recording (420) a random value/data pattern, determining (430) whether a system error has occurred, determining (440) whether a maximum iteration has been reached, determining (450) whether rebooting the system affects an NIC, reporting (460) the effect on the NIC, and rebooting (470) the system.

Writing (410) random data of 'x' bits at offset 'Y' may include writing a random value of size x at address offsets which increase incrementally from y=0 to y=N. Accordingly, recording (420) a random value/data pattern may include recording the written random value(s) at the address offsets, and recording the correspondence from data value to address. Writing (410) random data and recording (420) a random value/data pattern may be referred to as testing the system.

Determining (430) whether a system error has occurred may include continuously monitoring the system for crashes, reboots, and general network traffic. If the writing and recording steps are completed with no failures through the end of the configuration space (430, no branch), the method continues by determining (440) whether a maximum iteration has been reached. If an error is detected before the writing and recording steps are completed (430, yes branch), the method continues by determining (450) whether rebooting the host affects the NIC under test.

Determining (440) whether a maximum iteration has been reached may include determining a current iteration value, which may correspond to a counter value or other value configured to track a number of iterations for the method. Determining (440) whether a maximum iteration has been reached may additionally include comparing the current iteration value to a selected maximum iteration value. If the maximum iteration value has not been reached (440, no branch), the method continues by returning to writing (410) random data of 'x' bits at offset 'Y'. If the maximum iteration value has been reached (440, yes branch), the method concludes.

Determining (450) whether rebooting the host affects the NIC may include determining whether the NIC is configured such that a host reboot will impact said NIC. In at least some embodiments, determining (450) whether rebooting the host affects the NIC includes identifying previous system reboots, and determining whether an impact registered at the NIC at the time of said previous system reboots. If the NIC is indeed affected by host reboots (450, yes branch), the method continues by first determining and reporting (460) effect on NIC and rebooting (470) the entire system to a clean state. If the NIC is not affected by host reboots (450, no branch), the method continues by rebooting the entire system to a clean state.

Reporting (460) the effect on the NIC may include determining what effect the host reboot has on the NIC. In at least some embodiments, reporting (460) the effect on the NIC includes analyzing previous system reboots and subsequent NIC activity to determine how previous reboots impacted the NIC. In at least some embodiments, reporting (460) the effect on the NIC includes Upon determining any effects on the NIC, reporting (460) the effect on the NIC may include generating a report or description of the effect(s) and providing said report to a user or other system.

Rebooting (470) the system may include triggering a reboot of the entire system. In at least some embodiments, rebooting (470) the system additionally includes reinstalling one or more subject modules to ensure the system setup is in a clean state. In some embodiments, rebooting (470) the system includes reinstalling all system components. Subsequent to the completion of the system reboot and any required reinstallations, the method continues by determining (440) whether a maximum iteration has been reached.

FIG. 5 is a bar graph 500 depicting complexity of PCIe protocol in accordance with at least one embodiment of the present invention. With respect to the depicted embodiment, the complexity of the PCIe protocol can be calculated based on the following set of observations: first, the PCIe configuration space can be accessed as n=8, 16, 32-bit registers. Some of the registers should only be accessed using a specific width and doing otherwise results in incorrect or unspecified behavior of a device. Thus, for each type of register access, there are $2^8$, $2^{16}$, $2^{32}$ values that can be written corresponding to n=8, 16, 32, respectively. By writing all possible values to the registers, reserved bits of the space are also accessed. If the registers are written in a serial order, targeting one register at a time, the total number of writes required is equal to t=v*N, where N=4096, 2048, 1024 for byte, word, and long word accesses, respectively. If all values are written to all registers, the number of writes required to cover the space can reach a complexity of $10^{12}$. The ordering of transactions may be as important as structure when determining a device state; in other words, if access occurs in a wrong order, a device can get into unpredictable or unspecified states. Random access to registers can be performed by writing to k different registers at a time. Since k can range from 1 to N, the total number of accesses is equal to the permutation t=P(N, k) for k=1, 2, . . . N. For a value of k=2, the complexity of the space is shown as approximately $10^7$. The complexity can quickly reach as high as $10^{36}$ for k=10.

A device exposes several regions of memory defined as resources under sysfs. An example of common resource files include resource 0, resource 2, and resource 4, which correspond to internal registers, doorbells, MSI, etc. The size of these memory regions range from a few KB to 1 MB or more. Similar to the configuration space, the memory space can also be written in varying widths, serially or at random offsets. Hence, accesses similar to the configuration space can be performed on the memory region. Memory read and writes add an additional complexity dimension; since the memory region can be read only, write only, or read/write, incorrect access can lead to incorrect behavior on an endpoint.

Figure 6:
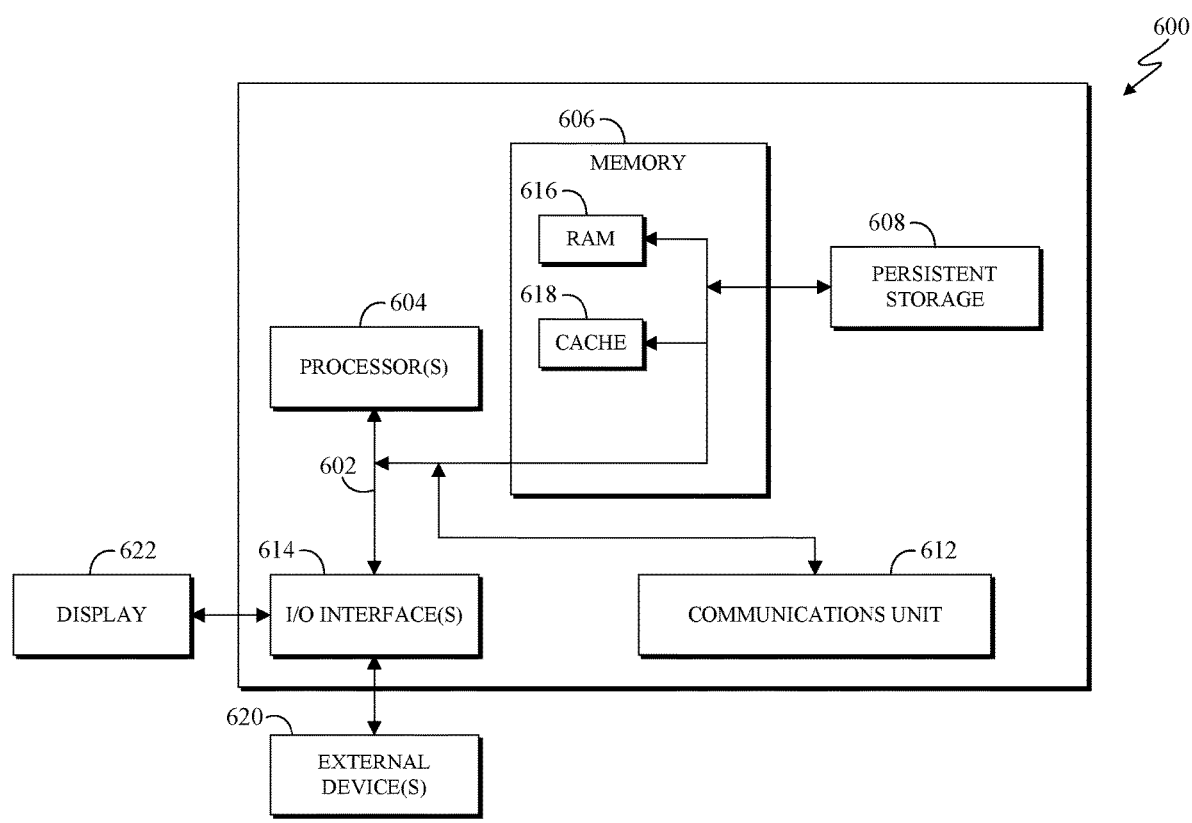
FIG. 6 is a block diagram of components of a computing system in accordance with an embodiment of the present invention.

FIG. 6 depicts a block diagram of components of computing system 600 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

As depicted, the computer 600 includes communications fabric 602, which provides communications between computer processor(s) 604, memory 606, persistent storage 608, communications unit 612, and input/output (I/O) interface(s) 614. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer-readable storage media.

One or more programs may be stored in persistent storage 608 for access and/or execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 612, in these examples, provides for communications with other data processing systems or devices. In these examples, communications unit 612 includes one or more network interface cards. Communications unit 612 may provide communications through the use of either or both physical and wireless communications links.

I/O interface(s) 614 allows for input and output of data with other devices that may be connected to computer 600. For example, I/O interface 614 may provide a connection to external devices 620 such as a keyboard, keypad, a touch screen, and/or some other suitable input device. External devices 620 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 608 via I/O interface(s) 614. I/O interface(s) 614 also connect to a display 622.

Display 622 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for assessing endpoint security, the method comprising:
    identifying a region of memory having root access through a vulnerability in a serial computer bus interface, the region of memory corresponding to a system of interest comprising one or more endpoints;
    determining an observable state of correct functionality for the system by performing at least one read/write operation on one or more registers of the region of memory having root access through the vulnerability in the serial computer bus interface;
    generating random transaction layer packets corresponding to the endpoint;
    injecting the generated transaction layer packets;
    monitoring the system following the injection of the generated transaction layer packets for erroneous patterns exhibited by the system; and
    reporting the erroneous patterns exhibited by the system.

2. The computer implemented method of claim 1, wherein generating random transaction layer packets corresponding to the endpoint is executed iteratively; and
    wherein the serial computer bus interface is a peripheral component interface.

3. The computer implemented method of claim 1, further comprising determining whether an elapsed testing time has exceeded a threshold testing time.

4. The computer implemented method of claim 3, further comprising terminating the method responsive to determining that the elapsed testing time has exceeded the threshold testing time.

5. The computer implemented method of claim 1, further comprising determining whether a maximum iteration of the method has been reached; and
    responsive to determining the maximum iteration of the method has been reached, terminating the method.

6. The computer implemented method of claim 1, further comprising rebooting the system responsive to injecting the generated transaction layer packets.

7. The computer implemented method of claim 6, further comprising:
    analyzing the erroneous patterns to identify causes of failures; and
    applying firmware fixes based on the identified causes of failures.

8. A computer program product for assessing endpoint security, the computer program product comprising:
    one or more non-transitory computer readable storage media and program instructions stored on the one or more non-transitory computer readable storage media, the program instructions comprising instructions to:
    identify a region of memory having root access through a vulnerability in a serial computer bus interface, the region of memory corresponding to a system of interest comprising one or more endpoints;
    determine an observable state of correct functionality for the system by performing at least one read/write operation on one or more registers of the region of memory having root access through the vulnerability in the serial computer bus interface;
    generate random transaction layer packets corresponding to the endpoint;
    inject the generated transaction layer packets;
    monitor the system following the injection of the generated transaction layer packets for erroneous patterns exhibited by the system; and
    report the erroneous patterns exhibited by the system.

9. The computer program product of claim 8, wherein the program instructions further comprise instructions to generate random transaction layer packets corresponding to the endpoint iteratively.

10. The computer program product of claim 8, wherein the program instructions further comprise instructions to determine whether an elapsed testing time has exceeded a threshold testing time.

11. The computer program product of claim 10, wherein the program instructions further comprise instructions to terminate the method responsive to determining that the elapsed testing time has exceeded the threshold testing time.

12. The computer program product of claim 8, wherein the program instructions further comprise instructions to determine whether a maximum iteration of the method has been reached; and
    terminate the method responsive to determining the maximum iteration of the method has been reached.

13. The computer program product of claim 8, wherein the program instructions further comprise instructions to reboot the system responsive to injecting the generated transaction layer packets.

14. The computer program product of claim 13, wherein the program instructions further comprise instructions to reinstall one or more system components responsive to rebooting the system.

15. A computer system for assessing endpoint security, the computer system comprising:
    one or more computer processors;
    one or more computer-readable storage media; and
    program instructions stored on the computer-readable storage media for execution by at least one of the one or more processors, the program instructions comprising instructions to:
    identify a region of memory having root access through a vulnerability in a serial computer bus interface, the region of memory corresponding to a system of interest comprising one or more endpoints;
    determine an observable state of correct functionality for the system by performing at least one read/write operation on one or more registers of the region of memory having root access through the vulnerability in the serial computer bus interface;
    generate random transaction layer packets corresponding to the endpoint;
    inject the generated transaction layer packets;
    monitor the system following the injection of the generated transaction layer packets for erroneous patterns exhibited by the system; and
    report the erroneous patterns exhibited by the system.

16. The computer system of claim 15, wherein the program instructions further comprise instructions to determine whether an elapsed testing time has exceeded a threshold testing time.

17. The computer system of claim 16, wherein the program instructions further comprise instructions to terminate the method responsive to determining that the elapsed testing time has exceeded the threshold testing time.

18. The computer system of claim 15, wherein the program instructions further comprise instructions to determine whether a maximum iteration of the method has been reached; and
   terminate the method responsive to determining the maximum iteration of the method has been reached.

19. The computer system of claim 15, wherein the program instructions further comprise instructions to reboot the system responsive to injecting the generated transaction layer packets.

20. The computer system of claim 19, wherein the program instructions further comprise instructions to reinstall one or more system components responsive to rebooting the system.

\* \* \* \* \*